United States Patent
Lonkar

(10) Patent No.: US 12,550,122 B2
(45) Date of Patent: Feb. 10, 2026

(54) SELECTIVE PAGING OF USER DEVICES IN WIRELESS COMMUNICATION NETWORKS

(71) Applicant: T-MOBILE INNOVATIONS LLC, Overland Park, KS (US)

(72) Inventor: Shon Lonkar, Maple Valley, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 353 days.

(21) Appl. No.: 18/313,977

(22) Filed: May 8, 2023

(65) Prior Publication Data

US 2024/0381311 A1 Nov. 14, 2024

(51) Int. Cl.
*H04W 68/02* (2009.01)

(52) U.S. Cl.
CPC .................. *H04W 68/02* (2013.01)

(58) Field of Classification Search
CPC . H04W 68/02; H04W 68/04; H04W 52/0216; H04W 68/00; H04W 68/005; H04W 52/0219; H04W 52/0251; H04W 52/0212; H04W 68/025; H04W 28/0221; H04W 76/10; H04W 52/02; H04W 72/56; H04W 52/0206; H04W 48/10; H04W 52/0254; H04W 64/00; H04W 74/006; H04W 36/0061; H04W 72/04; H04W 12/104; H04W 36/0016; H04W 76/19; H04W 88/02; H04W 4/80; H04W 68/08; H04W 4/029; H04W 52/0248; H04W 68/12; H04W 4/02; H04W 40/20; H04W 40/24; H04W 36/322; H04W 72/51; H04W 36/0094; H04W 8/02; H04W 8/005; H04W 8/22; H04W 92/02; H04W 88/08; H04W 28/0226; H04W 36/00; H04W 36/00835; H04W 36/008375; H04W 36/00838; H04W 36/32; H04W 76/15; H04W 84/042; H04W 88/185; H04W 12/72; H04W 16/24; H04W 28/0247; H04W 28/0289; H04W 92/20; Y02D 30/70; Y02D 30/00; H04J 11/0079; H04J 11/0056; H04J 11/0059; H04J 11/0069; H04J 11/00; H04L 1/188;

(Continued)

(56) References Cited

U.S. PATENT DOCUMENTS

| | | | |
|---|---|---|---|
| 2004/0157619 A1* | 8/2004 | Corson | H04W 68/00 455/456.1 |
| 2008/0254814 A1* | 10/2008 | Harris | H04W 68/06 455/458 |

(Continued)

*Primary Examiner* — Nimesh Patel

(57) ABSTRACT

Technology, including systems, methods, and devices, is disclosed herein to page a user device for communication with a wireless network. In an implementation, a mobility management function of the wireless network receives a request to page a user device. The mobility management function determines a set of network base stations to page the user device and sends, via the set of network base stations, a page to the user device. The set of network base stations is determined by filtering a base station history associated with the user device according to a filtering rule which includes the base station most recently in communication with the device. In some implementations, a set of base stations to page the user device is determined by filtering the base station history according to the time of the request during the trailing week.

20 Claims, 7 Drawing Sheets

(58) Field of Classification Search
CPC ............. H04L 41/0233; H04L 41/0816; H04L 5/1469; H04L 65/1023; H04L 69/28; H04L 5/0023; H04L 5/0078; H04L 5/0082; H04L 47/2483; H04B 7/0617; H04B 7/0695; H04B 7/0626; H04B 7/06; H04B 7/0452; H04B 7/18541; H04B 7/18513

See application file for complete search history.

(56) References Cited

U.S. PATENT DOCUMENTS

| | | | |
|---|---|---|---|
| 2012/0115515 A1* | 5/2012 | Lopez | H04W 68/04 455/458 |
| 2014/0106790 A1* | 4/2014 | Kakinada | H04W 68/04 455/458 |
| 2014/0302880 A1* | 10/2014 | Godin | H04W 68/02 455/458 |
| 2014/0376439 A1* | 12/2014 | Yi | H04W 68/08 370/312 |
| 2018/0041984 A1* | 2/2018 | Li | H04W 8/08 |
| 2019/0215800 A1* | 7/2019 | Fujishiro | H04W 68/005 |
| 2020/0015195 A1* | 1/2020 | Chong | H04W 68/06 |

* cited by examiner

| Time | Day 1 | Day 2 | Day 3 | Day 4 | Day 5 | Day 6 | Day 7 | Day 8 | 7-day base station filter |
|---|---|---|---|---|---|---|---|---|---|
| 0:00:00-0:59:59 | gNB 1 | gNB 1 | gNB 1 | gNB 1 | gNB 1 | gNB 1 | gNB 1 | | |
| 1:00:00-1:59:59 | gNB 1 | gNB 1 | gNB 1 | gNB 1 | gNB 1 | gNB 1 | gNB 1 | | |
| 2:00:00-2:59:59 | gNB 1 | gNB 1 | gNB 1 | gNB 1 | gNB 1 | gNB 1 | gNB 1 | | |
| 3:00:00-3:59:59 | gNB 1 | gNB 1 | gNB 1 | gNB 1 | gNB 1 | gNB 1 | gNB 1 | | |
| 4:00:00-4:59:59 | gNB 1 | gNB 1 | gNB 1 | gNB 1 | gNB 1 | gNB 1 | gNB 1 | | |
| 5:00:00-5:59:59 | gNB 1 | gNB 1 | gNB 1 | gNB 1 | gNB 1 | gNB 1 | gNB 1 | | |
| 6:00:00-6:59:59 | gNB 1 | gNB 1 | gNB 1 | gNB 1 | gNB 1 | gNB 1 | gNB 1 | | |
| 7:00:00-7:59:59 | gNB 10 | gNB 12 | gNB 2 | gNB 2 | gNB 11 | gNB 10 | gNB 2 | gNB 2 | gNBs 2, 10, 11, 12 |
| 8:00:00-8:59:59 | gNB 3 | gNB 3 | gNB 3 | gNB 3 | gNB 3 | gNB 3 | gNB 3 | | |
| 9:00:00-9:59:59 | gNB 4 | gNB 4 | gNB 4 | gNB 4 | gNB 4 | gNB 4 | gNB 4 | | |
| 10:00:00-10:59:59 | gNB 4 | gNB 4 | gNB 4 | gNB 4 | gNB 4 | gNB 4 | gNB 4 | | |
| 11:00:00-11:59:59 | gNB 4 | gNB 7 | gNB 4 | gNB 4 | gNB 4 | gNB 4 | gNB 4 | | |
| 12:00:00-12:59:59 | gNB 4 | gNB 4 | gNB 4 | gNB 4 | gNB 4 | gNB 4 | gNB 4 | | |
| 13:00:00-13:59:59 | gNB 4 | gNB 4 | gNB 4 | gNB 4 | gNB 4 | gNB 4 | gNB 4 | | |
| 14:00:00-14:59:59 | gNB 4 | gNB 4 | gNB 4 | gNB 4 | gNB 4 | gNB 4 | gNB 4 | | |
| 15:00:00-15:59:59 | gNB 4 | gNB 4 | gNB 4 | gNB 4 | gNB 4 | gNB 4 | gNB 4 | | |
| 16:00:00-16:59:59 | gNB 4 | gNB 4 | gNB 4 | gNB 4 | gNB 4 | gNB 4 | gNB 4 | | |
| 17:00:00-17:59:59 | gNB 4 | gNB 4 | gNB 4 | gNB 4 | gNB 4 | gNB 4 | gNB 4 | | |
| 18:00:00-18:59:59 | gNB 5 | gNB 5 | gNB 5 | gNB 5 | gNB 5 | gNB 5 | gNB 5 | | |
| 19:00:00-19:59:59 | gNB 6 | gNB 6 | gNB 6 | gNB 6 | gNB 6 | gNB 6 | gNB 6 | | |
| 20:00:00-20:59:59 | | gNB 8 | gNB 1 | gNB 1 | gNB 9 | gNB 1 | gNB 1 | gNB 1 | gNBs 1, 8, 9 |
| 21:00:00-21:59:59 | | gNB 1 | gNB 1 | gNB 1 | gNB 1 | gNB 1 | gNB 1 | gNB 1 | |
| 22:00:00-22:59:59 | | gNB 1 | | | | | | gNB 1 | |
| 23:00:00-23:59:59 | | gNB 1 | | | | | | gNB 1 | |

FIGURE 3

SELECTIVE PAGING OF USER DEVICES IN WIRELESS COMMUNICATION NETWORKS

TECHNICAL FIELD

Aspects of the disclosure are related to the field of wireless communication networks and in particular to user device location and paging.

BACKGROUND

In wireless communication network systems, when a network seeks to communicate with a user's mobile device, such as a smartphone, the network pages the device to establish communication with the device. For example, the network may need to transmit a text message to the device or transmit an incoming call to the device. However, when a device is not in communication with the network, it may be in an idle or dormant state with respect to the network to reduce battery power consumption. When the device receives the page from the network, the device "wakes up," so to speak, and acknowledges the page from the network. Upon receiving the acknowledgement, the network establishes a path through its various network elements by which to communicate with the device. For example, the network ascertains which cell tower the user device is within range of, and coordinates communication with the device through the cell tower and network elements associated with the cell tower.

However, mobile devices being mobile means that when the network pings the user device to establish communications, it does not always know where the device is. As such, the network may send multiple pages through multiple cell towers across multiple tracking areas until it receives an acknowledgement from the device. The multiple cell towers may send many such pages, but for each paged device, just one of those multiple cell towers will relay a successful response, and all the others will be fruitless. This results in a highly inefficient use of network resources.

OVERVIEW

Technology, including systems, methods, and devices, is disclosed herein to page a user device for communication with a wireless network. In an implementation, a mobility management function of the wireless network receives a request to page a user device. The mobility management function determines a set of network base stations to page the user device and sends, via the set of network base stations, a page to the user device. The set of network base stations is determined by filtering a base station history associated with the user device according to a first rule which includes the base station most recently in communication with the device. In some implementations, the first rule also includes base stations corresponding to the time of the request during the trailing week.

If the mobility management function does not receive a response to the page from the user device, the mobility management function determines a second set of base stations to page the user device and sends, via the second set of network base stations, a second page to the user device. The second set of network base stations is determined by filtering the base station history according to a second rule. In an implementation, the second rule includes a set of the base stations most recently in communication with the user device. In some implementations, the second rule also includes base stations corresponding to the time of the request during the trailing week.

In an implementation, if the mobility management function does not receive a response to the second page, the mobility management function determines a third set of base stations to page the user device and sends, via the third set of network base stations, a third page to the user device. In some implementations, the third rule includes the base stations within the most recent tracking area of the user device.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 3 illustrates an base station history of a wireless network in an implementation.

DETAILED DESCRIPTION

Figure 1:
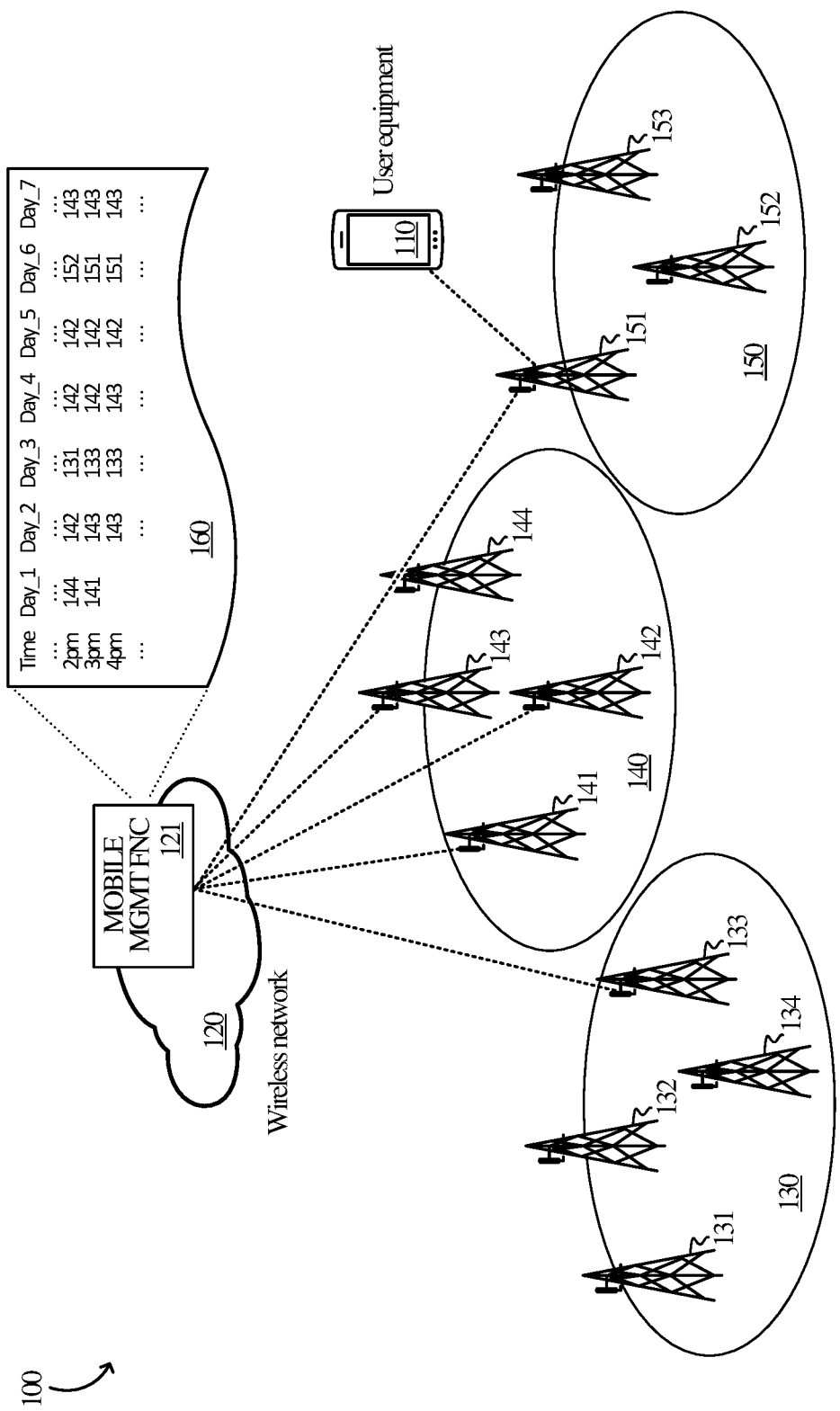
FIG. 1 illustrates an operational environment for paging a user device by a wireless network in an implementation.

Systems, methods, and devices are disclosed herein to operate a wireless network to establish communication with the user device. In an implementation, a user device is in a dormant or inactive state relative to the wireless network. A mobility management function of the network pages the device to, for example, send data or a call to the device. The mobility management function determines a set of network base stations to send the page. To determine the set of network base stations, the mobility management function consults a base station history associated with the user device. The mobility management function filters the base station history according to one or more selection criteria or filtering rules including one or more selection criteria. The criteria may include the most recent base station(s) in communication with the device or the base stations according to the time at which the request is received, such as base stations which the user device was in range at the same hour of the day, over the preceding seven days.

In an implementation, if the mobility management function does not receive a response to the page from the device, the mobility management function determines a second set of base stations to send a second page. The second set of base stations is determined by filtering the base station history according to another set of one or more criteria. Thus, if the first set of base stations are unsuccessful in paging the user device, the second set broadens the pool of paging base stations according to the base station history of the device.

In an implementation, if the first and second pages do not elicit a response from the user device, the mobility management function sends a third page to the user device via a third set of base stations, where the third set of base stations includes the base stations of the most recent tracking area of the user device.

When the device receives a page from a base station, the device awakens, i.e., sends a response to the network and registers for access to the network. One registered with the network, the device can communicate with the network, such as receiving the incoming data or call. The mobility management function stores the base station information along with the day and time of the page in the base station history for use in subsequent paging operations.

The criteria by which base stations are selected by the mobility management function are indicative of the base stations which are most likely to be successful in paging the user device based on the base station history of the device. Thus, a base station selection algorithm can be defined according to likelihood of success in reaching the user device based on the history. For example, the first filtering rule of the selection algorithm may identify the base station(s) most likely to be successful in paging the user device, the second filtering rule may identify the base station(s) likely to be successful in paging the user device, and the third filtering rule may identify a broader pool of base stations which may be successful by virtue of being in the most recent tracking area of the device. The selection algorithm may be defined to include more than three or fewer than three levels or rules. In various implementations, the selection criteria may filter according to the base station(s) that the device was most recently in range of. The selection criteria may also filter the base station history according to the work week versus the weekend, a propensity of the user device to connect to certain base stations during certain periods of time, such as when a user device is more often with the range of a particular base station between the hours of 8 am and 5 pm over a specified set of days in the history.

The base station history of a user device may include records of base station identifiers and days and times at which the user device was in communication with the base station. As the base station history accumulates records, the mobility management function of the network may cull the records to create a more concise summary or representation of the information. For example, the mobility management function may store a more granular set or a complete set of base station records of the preceding 24 hours, and for records more than 24 hours old, the mobility management function may store a single record per hour, up to 24 records per day, for the preceding seven days.

A technical advantage of the technology disclosed herein is to optimize or make more efficient the use of network resources to page a dormant user device based on the idea that user devices are routinely in communication with a limited number of base stations. By selecting base stations to page a user device according to the base station history, the likelihood of the user device receiving the page is improved. As a result, the number of pages that are sent by base stations of the wireless network is reduced, and the process of paging the dormant device is made more efficient. Optimizing the use of network resources to page the user device by minimizing the number of fruitless pages reduces unnecessary activity by those base stations and reduces the amount of useless paging data that is discarded at those base stations.

Turning now to the Figures, FIG. 1 illustrates operational environment 100 for paging a user device by a wireless network. Operational environment 100 includes user equipment 110, wireless network 120 including mobility management function 121, and tracking areas 130, 140, and 150. Mobility management function 121 is operatively connected to base station history 160 associated with user equipment 110. Each tracking area includes multiple access nodes: tracking area 130 includes access nodes 131-134, tracking area 140 includes access nodes 141-144, and tracking area 150 includes access nodes 151-153.

User equipment (UE) 110 is representative of smart-phones, computers, sensors, controllers, and/or some other user apparatus with processing circuitry for wireless communication. UE 110 exchanges wireless communication signals with access nodes, such as access node 151, over radio frequency bands. Access nodes 131-134, 141-144, and 151-153 are representative of equipment using radio frequencies to provide wireless connectivity to devices, such as Fifth Generation (5G) RANs, long-term evolution (LTE) RANs, gNodeBs, eNodeBs, NB-IoT access nodes, LP-WAN base stations, wireless relays, Wifi access nodes, Wifi hotspots, ENET access nodes, Bluetooth access nodes, and/or other wireless or wireline network transceivers.

UE 110 and access nodes 131-134, 141-144, and 151-153 are representative of wireless communication devices or radios which wirelessly communicate using protocols such as Fifth Generation New Radio (5GNR), 5G Advanced, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA).

Figure 7:
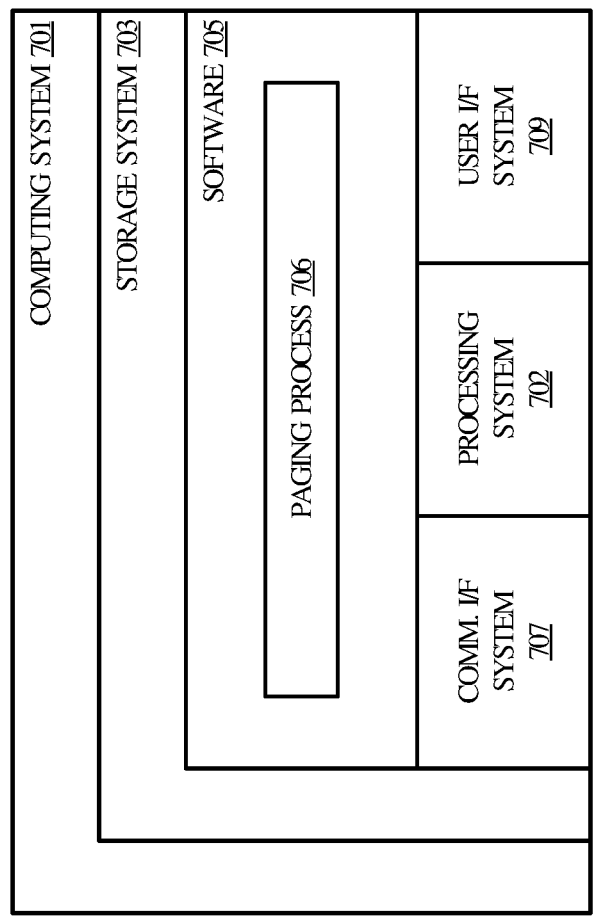
FIG. 7 illustrates a computing system suitable for implementing the various operational environments, architectures, processes, scenarios, and sequences discussed below with respect to the other Figures.

Mobility management function 121 is representative of a network function of wireless network 120. Mobility management function 121 can include an Access and Mobility Function (AMF) of a Fifth Generation New Radio (5G-NR) wireless network or a Mobility Management Entity (MME) of an LTE network. Mobility management function 121 is implemented on one or more suitable computing devices of which computing device 701 of FIG. 7 is representative. Examples include server computers, blade servers, and the like. Mobility management function 121 may be implemented in the context of one or more data centers, in a co-located or distributed manner, or in some other arrangement.

In an operational example of operational environment 100, wireless network 120 seeks to actively communicate with UE 110 at 4:30 pm. UE 110 is dormant or idle with respect to wireless network 120. Mobility management function 121 of wireless network 120 consults base station history 160 of UE 110 according to a selection algorithm to determine one or more base stations which will page the user device. The selection algorithm defines a set of rules by which base stations are selected to perform a paging operation. In an implementation, the selection algorithm specifies a first rule for selecting the last base station with which UE 110 was in communication. According to base station history 160, the last base station with which UE 110 was in communication is access node 141 at 3 pm. Mobility management function 121 directs access node 141 to transmit a page to UE 110. However, at the time of the page, UE 110 is no longer in range of access node 141, the page does not reach UE 110, and UE 110 does not respond.

Continuing the operational example, mobility management function 121 waits a predetermined amount of time (e.g., three seconds) for response, then proceeds with selecting access nodes for a second page according to a second rule of the selection algorithm. Mobility management function 121 determines from base station history 160 that UE 110 was in communication with access nodes 133, 142, 143, and 151 at 4 pm on various days of the preceding seven days. Mobility management function 121 directs access nodes 133, 142, 143, and 151 to transmit a page to UE 110. UE 110 is in range of access node 151, so UE 110 receives the page and sends an acknowledgement to wireless network 120 in response. In a variation on the operational example where the selection algorithm has three or more levels, UE 110 failed to respond to pages sent by the second set of base stations, mobility management function 121 would select a third set of base stations according to a third rule of the selection algorithm, and so on.

Figure 2:
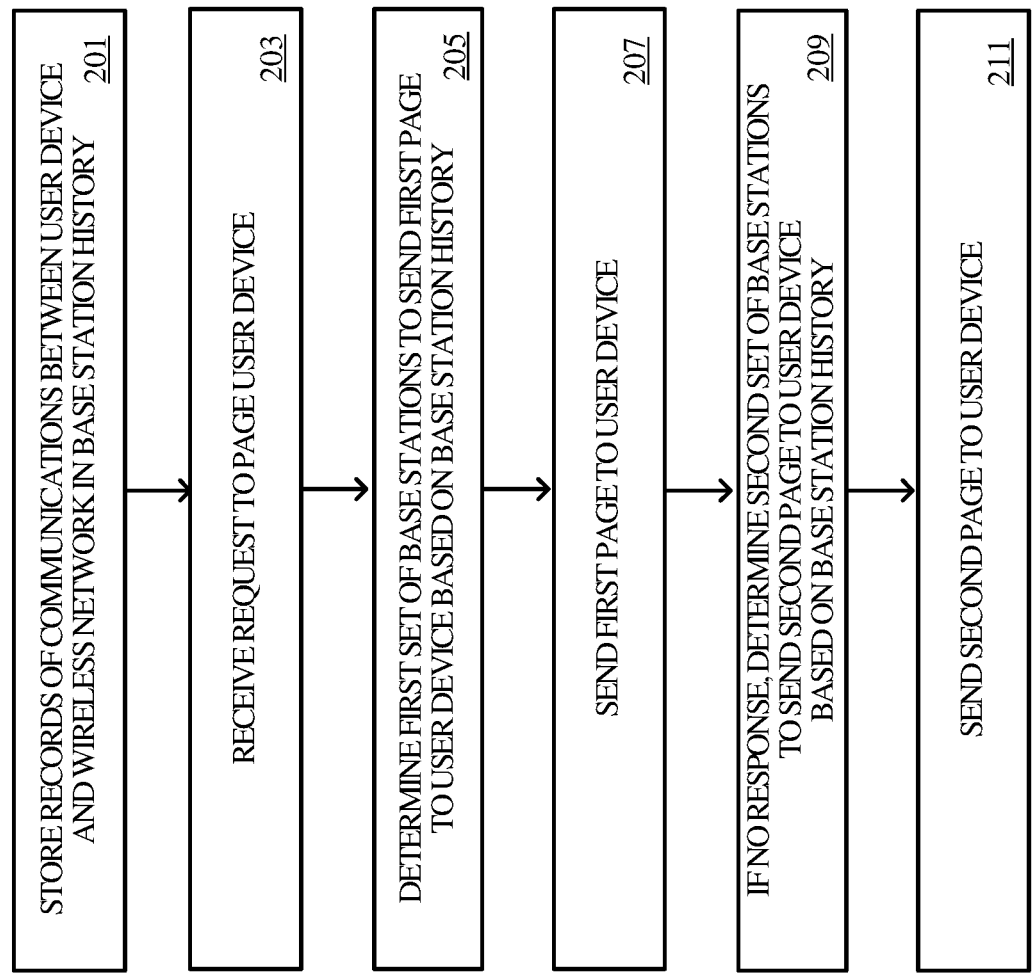
FIG. 2 illustrates a method of operating a wireless network for paging a user device in an implementation.

FIG. 2 illustrates process 200 for paging a user device by a wireless network in an implementation. Process 200 may be implemented on one or more computing devices, such as server computers or computers in the context of a network data center, according to program instructions which direct the computing devices to function as follows, referring parenthetically to the steps in FIG. 2 and in the singular for clarity.

In process 200, a mobility management function of a wireless network collects and stores records of communications between a user device and the wireless network in a base station history (step 201). In an implementation, the user device is subscribed to the wireless network, and the base station history includes records of communications between the user device and the network according to a day and time of the communication along with an identifier of the network base station with which the device was in communication. In an implementation, the base station history is a datastore searchable by day or time and includes records going back a prescribed number of days or hours (e.g., 168 hours) from the current time. As the user device connects to or communicates with the wireless network, the mobility management function stores a record of the communication in the database. As records age out of the prescribed timeframe, the records may be deleted from the base station history. The base station history may also include tracking area identifiers for each base station, or the mobility management function may cross-reference a database of base station identifiers and tracking area identifiers to determine tracking areas of the recorded base stations.

The mobility management function receives a request to page a user device (step 203). The user device may be in a low-power state or otherwise inactive with respect to the network, and the wireless network may wish to establish active communication with the user device, for example, to transmit data or a call to the device.

To establish active communication with the user device, the mobility management function determines which base station(s) of the wireless network will send a page to the device (step 205). In an implementation, to identify one or more base stations to send the page, the mobility management function consults a base station history associated with the user device. The base station history includes records of base stations with which the user device has been in communication during the past several days, such as during the past week. Each record includes a base station identifier and day and time of the communication or connection. The mobility management function filters the base station history according to filtering rules to determine which base station(s) will send the page with each filtering rule including one or more selection criteria. In an implementation, a first filtering rule includes the base station most recently in communication with the user device. In some implementations, the mobility management function may also apply a second criterion which identifies base station(s) with which the user device has been in communication with user device at the same time or same hour of the day as the current request. For example, if the request is received at 11:54 am, the mobility management function may filter the base station history for base stations that the user device has been in communication with at 11:00 am during the preceding seven days in the history.

Having determined the base station(s) which will send the page, the mobility management function transmits a request to those base station(s) to page the user device (step 207). In an implementation, the page includes a device identifier, such as its International Mobile Subscriber Identity (IMSI) or Temporary Mobile Subscriber Identity (TMSI). Each page sent by a cell tower or access node may include the respective location of the cell tower or access node. The page may be one of various types, such as a Mobile Terminated SMS page, a Service Request page, or a Mobile Terminated Data page.

Continuing process 200, if the wireless network does not receive a response to the page(s) sent by the base station(s), the mobility management function determines a second set of base stations to send a second page (step 209). In an implementation, the mobility management function waits a predetermined amount of time (e.g., three seconds) to receive a response from the user device before proceeding with identifying the second set of base stations. When the predetermined time has elapsed with no response from the user device, the mobility management function filters the base station history according to a second filtering rule of one or more selection criteria. For example, the mobility management function may identify the last five base stations most recently in communication with the user device. The second filtering rule may be applied so as to exclude any base stations which sent the first page. Having identified a second set of base stations, the mobility management function transmits a request to those base stations to send a second page to the user device (step 211).

In various implementations, if the second page fails to elicit a response from the user device within some predetermined amount of time, the mobility management function may again select a set of base stations to transmit a page to the user device. For example, to select a third set of base stations, the mobility management function may resort to selecting the base stations of the most recent tracking area of the user device.

By paging the device according to filtering rules, the mobility management function leverages knowledge of the device's recent behavior to identify base stations with a greater likelihood of contacting the user device. By doing so, this optimizes the use of network resources to contact the user device by minimizing the number of fruitless pages sent by network base stations, reducing unnecessary activity by those base stations, and reducing the amount of useless paging data that is discarded at those base stations.

Referring again to FIG. 1, operational environment 100 illustrates a brief example of process 200 as employed by elements of operational environment 100. In operation, UE 110 is dormant with respect to wireless network 120. At around 4:15 pm, wireless network 120 receives data, such as a text message or voice call, for UE 110 and seeks to connect with UE 110 to transmit the data. Mobility management function 121 consults base station history 160 associated with UE 110 to determine the most recent base station in communication with UE 110: access node 141 at 3 pm on Day_1 (the current day). Mobility management function 121 directs access node 141 to page UE 110. However, UE 110 is no longer within range access node 141 and does not receive the page. After waiting an interval of time for a response, mobility management function 121 selects a set of base stations to send a second page to UE 110. Mobility management function 121 filters base station history 160 to identify a set of base stations with which UE 110 was in communication over the preceding seven days at the same hour as the request, i.e., 4 pm. Applying this filtering rule, mobility management function 121 determines that UE 110 was in communication with access nodes 133, 142, 143, and 151. Mobility management function 121 directs access nodes 133, 142, 143, and 151 to send a page to UE 110. UE 110 is within range of access node 151 and receives the page. When UE 110 receives the page, it transmits a response to wireless network 120 to establish active communication with wireless network 120. Having identified a base station or access node in communication with UE 110, wireless network 120 registers UE 110 for access to wireless network 120 to receive the data.

FIG. 3 illustrates base station history 300 associated with a user device, of which base station history 160 of FIG. 1 is representative, in an implementation. Base station history 300 includes multiple records of base stations with which the associated user device has been in communication over the preceding seven days. For example, at 2 pm on Day 4, the user device was in communication or in range of gNB 4, an access node of a wireless communication network. Although base station history 300 illustrates base stations by hour of the day, it may be appreciated that base station records may be stored according to other intervals of time.

In various implementations, a mobility management function of a wireless network, such as an AMF of a 5G network, accesses base station history 300 to write records of base station interaction with the associated user device to a base station datastore and to read records of base station interactions from the datastore for performing paging operations. The mobility management function may continually update interactions on a last-in-first-out basis to maintain a database of base stations most recently in communication with the user device, going back over a specified number of days, such as over the trailing week. As illustrated in FIG. 3, "Day 1" may refer to the current day with each successive day going back in time (e.g., "Day 8" refers to records from seven days ago).

In some implementations, the mobility management function stores a complete record of base stations for the most recent period of time, such as the preceding 24 hours, then, as new records are added, culls the older data to a more limited sample of base station interactions. For example, for records that are more than 24 hours old, the mobility management function may keep one record per hour, for a maximum or total of 24 records per day with each record limited to including a specified maximum number of base stations (for example, one base station per record, one record per hour).

In a brief operational example, if the wireless network seeks to contact the user device when the device is in a dormant or low-power state at 8:32 pm, the mobility management function consults base station history 300 to determine the base station most recently in contact with the user device. In consulting base station history 300, the mobility management function may filter the records in base station history 300 to generate a selection of base stations to page the user device. To filter the records, the mobility management function may use filtering criteria to select base stations for paging operations. For example, a criterion of a filtering rule may be the base station most recently in communication with the user device, gNB 6, indicated by record 301 in FIG. 3. Another criterion may be a set of base stations (e.g., three base stations) most recently in communication with the user device which yields gNBs 4, 5, and 6, as illustrated by records 303. The base stations most recently in communication with the user device may be the base stations of the three most recent or preceding records. In some implementations, the base stations most recently in communication with the user device may instead be determined as three different base stations that were most recently in communication with the device regardless of how long ago they were in communication with the device.

In some implementations, another criterion for filtering base station history 300 may be base stations in communication with user device during, say, the prior week which occurred at the same time or hour of the day as the time the request was received. Other criteria may select base stations according to the time of the request and according to whether the request is received during the work week or on the weekend. Filtering rules may include one or more criteria. Filter rules or criteria may also be contingent on the result of applying another criterion, such as when two rules produce an overlapping set of base stations. For example, if a first page is sent by the base station most recently in communication with the user device, a second page may be sent by a set of three base stations most recently in communication with the user device but excluding the base station which sent the first page.

Continuing the operational example, if the first round of paging fails to elicit a response from the user device, the mobility management function identifies a second set of base stations to page the user device by applying a criterion which identifies base stations according to the time of the request. The mobility management function determines the base stations which were in contact with the device at 8 pm hour during the preceding seven days-gNBs 1, 8, and 9 (records 305). The number of days to look back in the history at a given time may vary, for example, the rule may specify base stations of the preceding three days-gNBs 1 and 8. The mobility management function directs the next set of base stations to page the user device. Depending on whether a response is received, the mobility management function may determine a set of base stations for a third round of paging.

In another operational example of selecting base stations based on base station history 300, if the user device had been dormant at 8:44 am on Day 1 (it will be assumed for illustration purposes that the device was dormant and its location unknown at 8:44 am on Day 1), the mobility management function determines a first set of base stations to page the device based on two criteria: the most recent base station in communication with the device plus the base stations in communication with the device at the 8 am hour during the trailing week. Applying these two criteria to base station history 300 would yield gNB 1 (record 307) and gNBs 2, 10, 11, and 12, (records 309). Assuming the device was in range of gNB 10 at 8:44 am on Day 1, the first round of paging would be successful and no further paging would be necessary. If, however, the device does not respond to pages from the identified base stations, the mobility management function may determine a second set of base stations according to another filtering rule: the base stations most recently in communication with the device over the preceding three hours (from 5 am to 7:59:59 am), which yields gNB 1 (records 311). However, since this base station already attempted but failed to communicate with the user device in the first round of paging, the mobility management function may go to a third set of base stations according to a third rule: the base stations of the most recent tracking area, i.e., the base stations of the tracking area of gNB 1.

Figure 4:
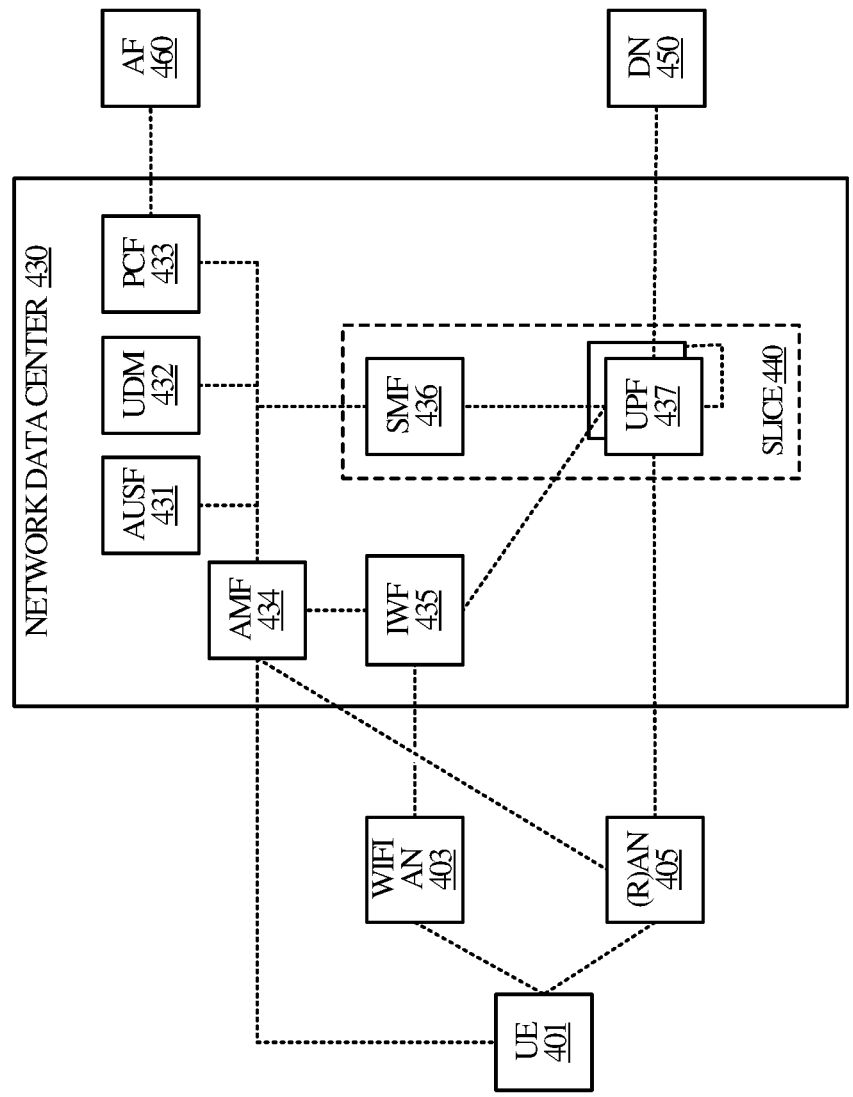
FIG. 4 illustrates a network data center of a wireless network in an implementation.

FIG. 4 illustrates exemplary wireless communication system 400 that serves wireless User Equipment (UE) 401 based on policies. Wireless communication system 400 includes UE 401, Wifi Access Node (AN) 403, 5GNR RAN 405, Interworking Function (IWF) 435, Access and Mobility Management Function (AMF) 434, Authentication Server Function (AUSF) 431, Unified Data Management (UDM) 432, Policy Control Function (PCF) 433, Session Management Function (SMF) 436, User Plane Function (UPF) 437, and Application Function (AF) 460. IWF 435 includes non-3GPP IWFs (N3IWFs) for providing untrusted non-3GPP access to network data center 430, such as access via a non-cellular access network. Wireless network slice 440 includes UPF 437 and SMF 436. DN 450 is representative of a data network, Internet access, third-party resource, or other endpoint of an end-to-end communication path from UE 401.

In an implementation, UE 401 communicates with network data center 430 via 5GNR access node 405 or Wifi access node 403. UE 401 requests access to DN 450 via the communication network of network data center 430. SMF 436 receives the access request from AMF 434 and other network functions of the communication network which are enforcing various aspects of the access request from UE 401. SMF 436 receives policies or policy decisions from AUSF 431, UDM 432, PCF 433, and/or AMF 434.

Figure 5:
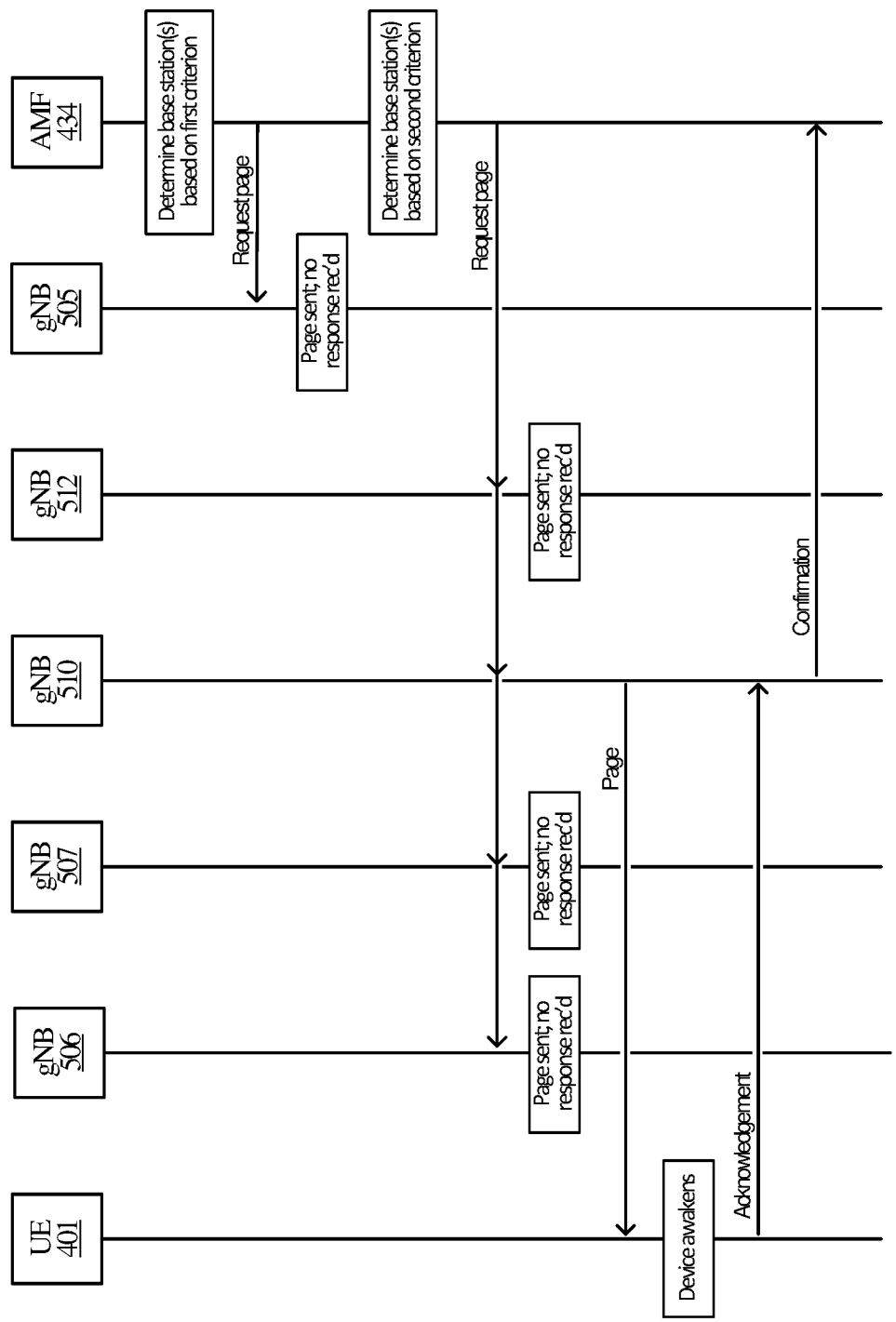
FIG. 5 illustrates an operational scenario of paging a user device by a wireless network in an implementation.

FIG. 5 illustrates operational scenario 500 for paging a user device by a wireless network in an implementation and referring to elements of FIG. 4. It is further assumed for the illustration purposes that the wireless communication system, of which network data center 430 is a network core, includes multiple gNodeB access nodes 505, 506, 507, 510, and 512, of which RAN 405 is representative.

In FIG. 5, AMF 434 receives a request from wireless communication system 400 to establish active communication with UE 401, which is in a low-power state or dormant with respect to wireless communication system 400. AMF 434 determines one or more base stations to page UE 401 by consulting a history of base station interactions for UE 401. AMF 434 identifies from the base station history that UE 401 was most recently in communication with gNodeB (gNB) 505 and directs gNodeB 505 to page UE 401. For illustration purposes, it will be assumed that gNodeB 505 sends the page but does not receive a reply from UE 401.

After a waiting period, having failed to receive a reply from UE 401, AMF 434 determines one or more base stations for a second round of paging UE 401. AMF 434 determines the base stations for the second round by filtering the base station history according to two criteria: the five base stations most recently in communication with UE 401, but excluding the base station of the first round, and the base stations with which UE 401 was in communication at the same time over the preceding seven days. AMF 434 determines that gNodeBs 506, 507, 510, and 512 meet one or both filtering criteria and directs the base stations to send a second page to UE 401.

The second set of base stations, gNodeBs 2, 10, 11, and 12 send pages to UE 401. Of the pages sent by the four base stations, the page from gNodeB 12 is received by UE 401, which awakens and sends a reply or acknowledgement of receiving the page back go gNodeB 12. gNodeB 12 sends a confirmation to AMF 434 that it is in active communication with UE 401, which serves to identify for AMF 434 the hardware and/or software elements of wireless communication system 400 which will handle transmissions between UE 401 and the network.

Figure 6:
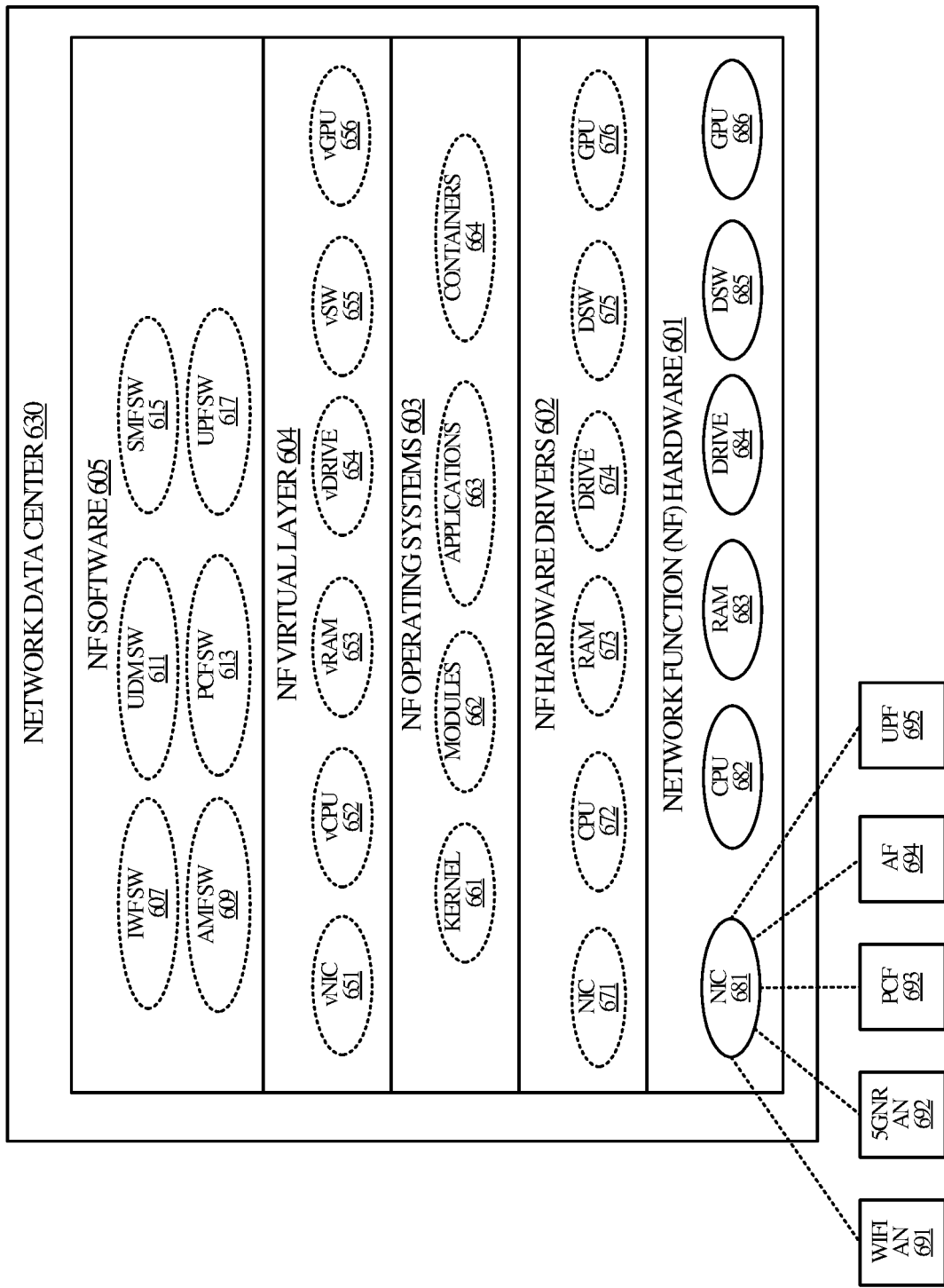
FIG. 6 illustrates a systems architecture of a network data center of a wireless network in an implementation.

FIG. 6 illustrates exemplary network data center 630, a network core of a wireless communication system, of which wireless network 120 of FIG. 1 is representative. Network data center 630 includes network function (NF) software 605, network function virtual layer 604, network function operating systems 603, network function hardware drivers 602, and network function hardware 601.

Network function software 605 of network data center 630 includes software for executing various network functions: IWF software 607, AMF software 609, UDM software 611, PCF software 613, SMF software 615, and UPF software 617. Other network function software, such as network repository function (NRF) software, are typically present but are omitted for clarity.

Network function virtual layer 604 includes virtualized components of network data center 630, such as virtual NIC 651, virtual CPU 652, virtual RAM 653, virtual drive 654, virtual software 655, and virtual GPU 656. Network operating systems 603 includes components for operating network data center 630, including kernels 661, modules 662, applications 663, and containers 664 for network function software execution. Network function hardware drivers 602 include software for operating network function hardware 601 of network data center 630, including network interface card (NIC) drivers 671 for network interface cards (NICs) 681, CPU drivers 672 for CPUs 682, RAM drivers 673 for RAM 683, flash/disk drive drivers 674 for flash/disk drives 684, data switch (DSW) drivers 675 for data switches 685, and drivers 676 for GPUs 686. Network interface cards 681 of network function hardware 601 include hardware components for communicating with Wifi access node 691, 5GNR access node 692, PCF 693, application server 694, and UPF 695.

Turning now to FIG. 7, architecture 700 illustrates computing device 701 that is representative of any system or collection of systems in which the various processes, programs, services, and scenarios disclosed herein may be implemented. Examples of computing device 701 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements paging process 706, which is representative of the paging processes discussed with respect to the preceding Figures, such as process 200. When executed by processing system 702, software 705 directs processing system 702 to operate as described herein for at least the various processes, operational scenarios, and sequences discussed in the foregoing implementations. Computing device 701 may optionally include additional devices, features, or function not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including paging process 706) may be implemented in program instructions and among other functions may, when executed by processing system 702, direct processing system 702 to operate as described with respect to the various operational scenarios, sequences, and processes illustrated herein. For example, software 705 may include program instructions for implementing the paging processes and operations as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support user device paging. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary, etc.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless network, the method comprising:
   storing, by a mobility management function of the wireless network, records of communications between a user device and base stations of the wireless network in a base station history associated with a user device, wherein each record of the records includes a base station identifier associated with a communication between the user device and the wireless network according to a day and a time of the communication;
   receiving, by the mobility management function, a request to page the user device, wherein the user device is in a dormant state;
   determining, by the mobility management function, a first subset of base stations of the wireless network for paging the user device based on filtering the base station history according to a first rule of a selection algorithm, wherein the first rule comprises the base station most recently in communication with the user device;
   sending, by the mobility management function, a first page to the user device via the first subset of base stations; and
   if no response to the first page is received from the user device,
      determining, by the mobility management function, a second subset of base
      stations of the wireless network based on filtering the base station history according to a second rule of the selection algorithm; and
      sending, by the mobility management function, a second page to the user device via the second subset of base stations.

2. The method of claim 1, further comprising:
   if no response to the second page is received from the user device,
   determining, by the mobility management function, a third subset of base stations of the wireless network based on filtering the base station history according to a third rule of the selection algorithm; and
   sending, by the mobility management function, a third page to the user device via the third subset of base stations.

3. The method of claim 2, wherein the third rule comprises base stations within the most recent tracking area of the user device.

4. The method of claim 1, wherein the base station history associated with the user device comprises a listing by hour of base stations of the wireless network that the user device was in range of for a trailing week relative to the request.

5. The method of claim 4, wherein the first rule further comprises base stations corresponding to a time of the request during the trailing week, and wherein the second rule comprises base stations most recently in communication with the user device.

6. The method of claim 4, wherein the second rule comprises base stations most recently in communication with the user device was in range of and base stations corresponding to a time of the request during the trailing week.

7. The method of claim 1, further comprising:
   receiving, by a base station of the wireless network, a response from the user device; and
   storing, by the mobility management function, a record associated with the response in the base station history.

8. The method of claim 1, wherein each of the base stations comprises an eNodeB base station or a gNodeB base station.

9. The method of claim 1, wherein the mobility management function comprises one of: an Access and Mobility Management Function (AMF) and a Mobile Management Entity (MME).

10. A computing apparatus comprising:
   one or more non-transitory computer-readable storage media;
   one or more processors operatively coupled with the one or more computer-readable storage media; and program instructions stored on the one or more computer-readable storage media that, when executed by the one or more processors, direct the computing apparatus to:

store records of communications between a user device and base stations of a wireless network in a base station history associated with the user device, wherein each record of the records includes a base station identifier associated with a communication between the user device and the wireless network according to a day and a time of the communication;

receive a request to page the user device, wherein the user device is in a dormant state;

determine a first subset of base stations of the wireless network based on filtering the base station history according to a first rule of a selection algorithm, wherein the first rule comprises the base station most recently in communication with the user device;

send, via the first subset of base stations, a first page to the user device; and if no response to the first page is received from the user device, determine a second subset of base stations of the wireless network based on filtering the base station history according to a second rule of the selection algorithm; and send, via the second subset of base stations, a second page to the user device.

11. The computing apparatus of claim 10, the program instructions further directing the computing apparatus to:

if no response to the second page is received from the user device, determine a third subset of base stations of the wireless network based on filtering the base station history according to a third rule of the selection algorithm; and send, via the third subset of base stations, a third page to the user device.

12. The computing apparatus of claim 11, wherein the third rule comprises base stations within the most recent tracking area of the user device.

13. The computing apparatus of claim 10, wherein the base station history associated with the user device comprises a listing by hour of base stations of the wireless network that the user device was in range of for a trailing week relative to the request.

14. The computing apparatus of claim 13, wherein the first rule further comprises base stations corresponding to a time of the request during the trailing week, and wherein the second rule comprises base stations most recently in communication with the user device.

15. The computing apparatus of claim 13, wherein the second rule comprises a set of the base stations most recently in communication with the user device and base stations corresponding to a time of the request during the trailing week.

16. The computing apparatus of claim 10, the program instructions further directing the computing apparatus to:

receive, by a base station of the wireless network, a response from the user device; and store, in the base station history, a record associated with the response.

17. The computing apparatus of claim 10, wherein each of the base stations comprises an eNodeB base station or a gNodeB base station.

18. A method of operating a wireless network, the method comprising:

storing, by the wireless network, records of communications between a user device and base stations of the wireless network in a base station history associated with the user device, wherein each record of the records includes a base station identifier associated with a communication between the user device and the wireless network according to a day and a time of the communication;

receiving, by the wireless network, a request to page the user device, wherein the user device is in a dormant state;

determining, by the wireless network, a first subset of base stations of the wireless network based on filtering the base station history according to a first rule of a selection algorithm, wherein the first rule comprises a base station most recently in communication with the user device;

sending, by the first subset of base stations, a first page to the user device; and if no response to the first page is received from the user device, determining, by the wireless network, a second subset of base stations of the wireless network based on filtering the base station history according to a second rule of the selection algorithm; and sending, by the second subset of base stations, a second page to the user device.

19. The method of claim 18, wherein the first rule further comprises base stations corresponding to a time of the request during a trailing week, and wherein the second rule comprises base stations most recently in communication with the user device.

20. The method of claim 18, wherein the second rule comprises base stations most recently in communication with the user device and base stations corresponding to a time of the request during a trailing week.

* * * * *